(12) United States Patent
Ortiz et al.

(10) Patent No.: US 6,365,252 B1
(45) Date of Patent: Apr. 2, 2002

(54) MULTI-PIECE FLEXURAL PIVOT

(75) Inventors: Michael Angelo Ortiz, Utica; Daniel Joseph Salerno, Marcy; Richard Joseph Donegan, West Monroe, all of NY (US)

(73) Assignee: Lucas Aerospace Power Transmission, Utica, NY (US)

( * ) Notice: Subject to any disclaimer, the term of this patent is extended or adjusted under 35 U.S.C. 154(b) by 0 days.

(21) Appl. No.: 09/293,693

(22) Filed: Apr. 16, 1999

(51) Int. Cl.[7] ............................... F16D 1/00; F16D 1/18
(52) U.S. Cl. ..................... 428/36.9; 428/34.1; 267/140; 248/614; 29/416; 403/291; 156/250; 156/257
(58) Field of Search ............................... 428/36.9, 36.91, 428/34.1; 267/160, 158, 165; 248/603, 604, 614, 626; 156/250, 256, 257; 29/436, 416, 896.9, 898.04; 403/291

(56) References Cited

U.S. PATENT DOCUMENTS

| 3,124,873 A | | 3/1964 | Troeger | |
|---|---|---|---|---|
| 3,181,918 A | | 5/1965 | Troeger | |
| 3,319,951 A | | 5/1967 | Seelig | |
| 3,825,992 A | * | 7/1974 | Troeger | 29/436 |
| 4,637,596 A | * | 1/1987 | Lewis | 267/160 |
| 4,997,123 A | * | 3/1991 | Backus et al. | 228/182 |
| 5,061,107 A | * | 10/1991 | Brooks | 403/24 |
| 5,335,418 A | * | 8/1994 | Krivec | 30/266 |

* cited by examiner

Primary Examiner—Rena L. Dye
(74) Attorney, Agent, or Firm—Stephen B. Salai, Esq.; Brian B. Shaw, Esq.; Harter, Secrest & Emery LLP

(57) ABSTRACT

A flexural pivot assembly which reduces the number of component parts to five and reduces the number of operations in the manufacturing process is disclosed. The component parts include two sleeves, one inner flexure, one outer flexure, and one slotted tubular core that may be coated with a suitable bonding material. The core has a slotted end and an unslotted end and includes two pairs of diametrically opposed flexure slots each having substantially the same length as a side of a flexure so that the interlocked flexures can slide into the slotted end of the tubular core until they abut an end of the flexure slots and, at the same time, be positioned flush with the slotted end. The core further includes a pair of diametrically opposed travel slots. During a method of manufacturing the flexural pivot assembly, after the flexures are inserted into the tubular core, the sleeves are slid over the core until one sleeve is located at the end of the flexure slots and the second sleeve is flush with the slotted end, thus leaving a small gap between the sleeves. The assembly is then heated until the bonding material bonds the components together. Alternatively, the assembly may be welded together. After bonding or welding, the unslotted section of the core is then cut off.

25 Claims, 4 Drawing Sheets

MULTI-PIECE FLEXURAL PIVOT

FIELD OF THE INVENTION

The present invention relates generally to flexural pivots and more particularly relates to a multi-piece flexural pivot which requires fewer parts and is more cost effective to manufacture than prior art flexural pivots.

BACKGROUND OF THE INVENTION

Prior art flexural pivots are typically fabricated by brazing four quadrants, inner and outer flexural members, and a sleeve into a flexural pivot assembly. The described arrangement has a plurality of brazed joints which are prone to fracture when the pivot is subjected to vibration and shock loading. Failures in which individual quadrants of the four quadrants separate from the flexural members and outer sleeve, or in which the pivot core separates from the outer sleeve, by fracturing at the brazed joints are common.

Another problem encountered with brazed flex pivots using an outer sleeve is a condition called "bridging". Bridging occurs when the braze material used to join the pivot and core to the outer sleeve flows into an undercut area of the pivot and hence prevents flexing.

Further, the manufacturing processes for these prior art flex pivots are lengthy and include a variety of expensive, labor intensive operations. The resulting flex pivot has a high cost and a long manufacturing lead time. This prevents the flex pivot from being used in many applications where it would otherwise be advantageous.

SUMMARY OF THE INVENTION

Thus, it is an object of this invention to provide a flex pivot which only needs to be heat treated once, thereby reducing the chances for bridging, embrittlement, and flexure warping.

It is a further object of this invention to provide a flex pivot in which fewer assembly operations will be required.

It is a further object of this invention to provide a reduction in cost and manufacturing lead time for flex pivots.

It is a further object of this invention to utilize a one piece core which replaces the use of four quadrants in prior art flex pivots.

It is a further object of this invention to utilize a uniform thickness of the inner wall of the core to eliminate the thin quadrant pieces found in prior art flex pivots.

In a preferred embodiment of the present invention, component parts for constructing a flexural pivot include a tubular core having an unslotted end and a slotted end, a first and second pair of diametrically opposed unconnected and spaced apart flexure slots extending from the slotted end and partially into the tubular core ending at a point prior to reaching the unslotted end, each flexure slot having a length and, first and second interlocking flexures, wherein the interlocking flexures are positioned within the tubular core such that two sides of the first interlocking flexure are positioned within the first pair of diametrically opposed flexure slots and two sides of the second interlocking flexure are positioned within the second pair of diametrically opposed flexure slots. Preferably, each flexure slot in the tubular core extends a substantially equal distance from the slotted end. Each flexure slot may be positioned approximately 90 degrees from an adjacent flexure slot, or at other angular orientations if desired.

The tubular core may include a pair of diametrically opposed travel slots extending from the slotted end into the tubular core and positioned approximately 45 degrees from adjacent flexure slots, or at other angular orientations if desired, and each travel slot may extend further into the tubular core than each of the flexure slots, while the travel slots may be substantially equal in length to each other.

The first interlocking flexure may comprise a flat inner spring and the second interlocking flexure may comprise a flat outer spring, the inner spring fitted within the outer spring, the outermost sides of the interlocking flexures being substantially straight and equal in length to the length of the flexure slots so that abutment of the flexures at the end of a flexure slot results in flush positioning of the flexures with the slotted end of the core.

The component parts of the flexural pivot may further include a first sleeve and a second sleeve, the first sleeve having a first inner radius and a second inner radius, the first inner radius being greater than the second inner radius, the second sleeve having a third inner radius and a fourth inner radius, the third inner radius being greater than the fourth inner radius where the first sleeve and second sleeve are sized to slide over the tubular core. Preferably, a combined length of the first sleeve and second sleeve is slightly less than the length of a flexure slot so that a space can be left between the two sleeves.

In fabricating a multi-piece flexural pivot using the above-described component parts, a method is described herein which includes the steps of forming a slotted tubular core with a slotted end and an unslotted end, sliding at least two flexures within slots of a slotted section of the slotted tubular core so as to be flush with the slotted end, placing first and second sleeves over the core so that the first and second sleeves do not touch each other and the second sleeve is flush with the slotted end, and, cutting off an unslotted section of the core including the unslotted end. The step of forming the slotted tubular core preferably comprises cutting two pairs of diametrically opposed flexure slots for receiving the at least two flexures and for dividing the slotted end into quadrants and the step of sliding at least two flexures within slots comprises inserting the flexures within the flexure slots until they abut an end of the slots. Prior to the step of sliding the two flexures within the flexure slots, the method may include the step of interlocking an inner flexure in an outer flexure and forming a pair of interlocking flexures having sides substantially equal in length to the flexure slots.

The method may further comprise cutting a pair of diametrically opposed travel slots into the slotted end of the tubular core.

Further, the method may include the step, prior to sliding the two flexures within slots, of applying a bonding material to the core and holding the tubular core at its unslotted end for assembly and of placing the tubular core, flexures, and sleeves within a furnace and heating until the bonding material flows and bonds the flexures, core, and sleeves together.

Alternatively, the method may comprise the step of welding together the flexures to the core prior to placing the first and second sleeves on the core and then welding the sleeves in position on the core, prior to cutting the unslotted section off the core.

BRIEF DESCRIPTION OF THE DRAWINGS

The foregoing objects and advantages of the invention will appear more fully hereafter from the consideration of the description which follows, taken together with the accompanying drawings wherein preferred embodiments of the invention are illustrated. It is to be expressly understood, however, that the drawings are for purpose of illustration and description and not to be construed as defining the limits of the invention.

DETAILED DESCRIPTION OF THE PREFERRED EMBODIMENTS

Figure 1:
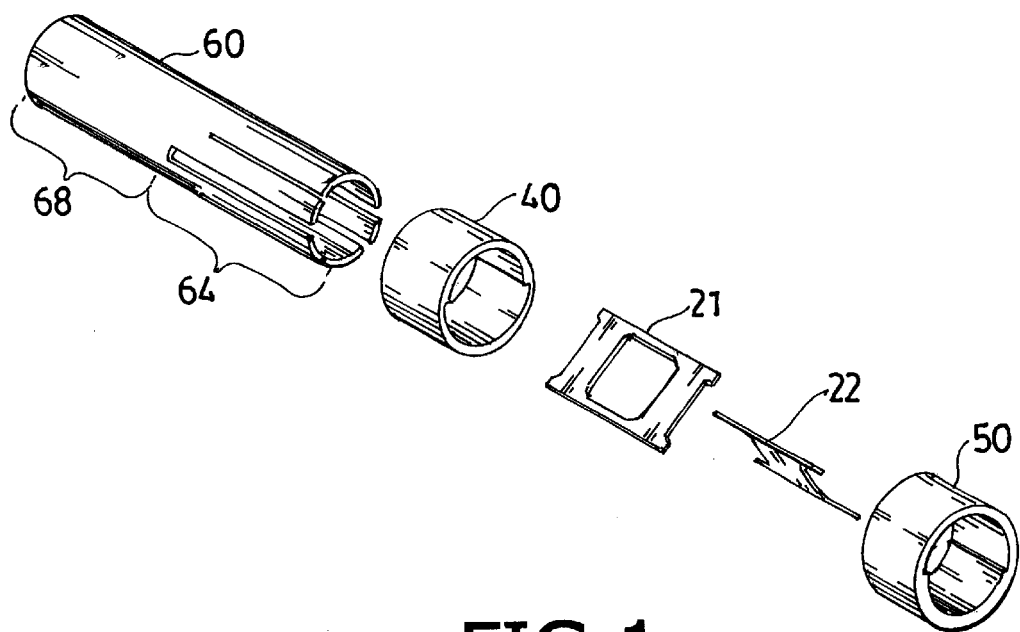
FIG. 1 shows an exploded side perspective view of components for a flexural pivot of the present invention.

The flexural pivot will consist of the five parts shown in FIG. 1: two sleeves 40, 50, one inner flexure 22, one outer flexure 21, and one core 60 that may be coated with a suitable bonding material, not shown.

Figure 2:
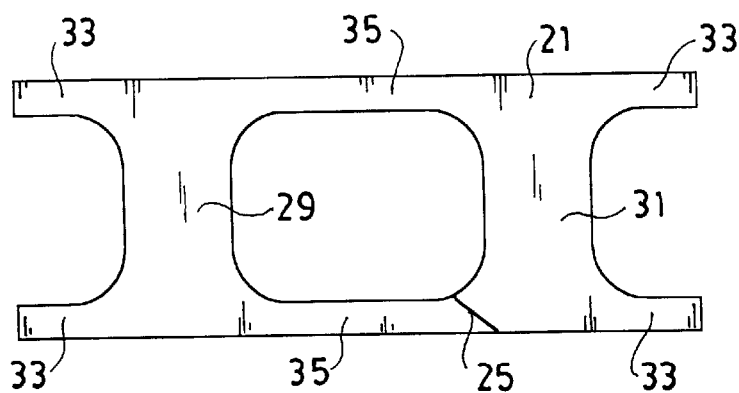
FIG. 2 shows a side plan view of an outer flexure for use in the flexural pivot of the present invention.
Figure 3:
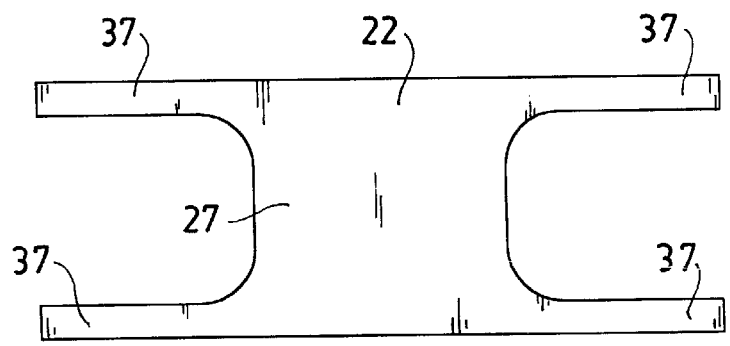
FIG. 3 shows a side plan view of an inner flexure for use in the flexural pivot of the present invention.
Figure 4:
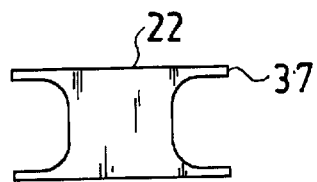
FIG. 4 shows a side plan view of another design for an inner flexure for use in the flexural pivot of the present invention.
Figure 5:
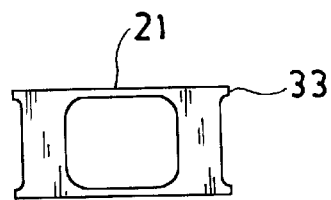
FIG. 5 shows a side plan view of another design for an outer flexure for use in the flexural pivot of the present invention.

The inner 22 and outer 21 flexures are preferably two flat springs as shown in FIGS. 2 and 3. I-shaped spring 22 may be slipped through insertion opening 25 in the square D-shaped spring 21 and the cross element 27 is arranged perpendicular to cross bars 29 and 31 of the square D-shaped spring 21. Spring 21 has at each end of its cross bars 29 and 31 projections or fingers 33 extending perpendicularly. Parts 35 between each end of cross bars 29 and 31 can also be referred to as projections. I-shaped spring 22 also has projections 37. It is to be noted that the various projections have the same thickness as the cross members since the springs are made from sheet metal. While the springs 21 and 22 are shown with enlarged fingers 33 and projections 37, the design of the springs 21 and 22 could be as shown in FIGS. 4 and 5 where the fingers 33 and 37 are somewhat less pronounced. In addition, the flexibility of the sheet metal itself may allow for the insertion of the spring 22 into the spring 21 without requiring the insertion opening 25 shown in FIG. 2. Also, while the springs are shown as a pair and as arranged perpendicularly, it should be further noted that many alternate spring arrangements can be used without departing from the spirit and scope of the invention.

Figure 6:
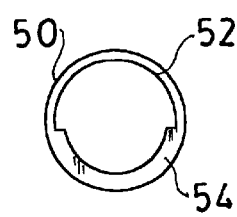
FIG. 6 shows a front cross-sectional view of one sleeve for use in the flexural pivot of the present invention.
Figure 8:
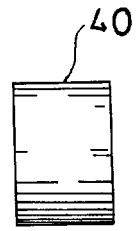
FIG. 8 shows a side plan view of the sleeves for use in the flexural pivot of the present invention.
Figure 7:
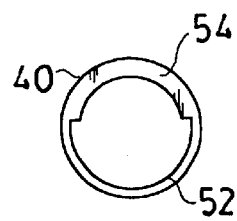
FIG. 7 shows a front cross-sectional view of another sleeve for use in the flexural pivot of the present invention.

Sleeves 40 and 50 are preferably substantially identical although arranged differently in the construction of the flexural pivot. Each sleeve includes an undercut area 52 shown in FIGS. 6 and 7 which has a thinner wall thickness than area 54 of the sleeves. In other words, the inside radius of the area 54 is less than the inside radius of area 52, while the outside diameter of the sleeves preferably remains constant. With a consistent outside diameter, both sleeves 40, 50 will have the side view shown in FIG. 8. The ends of the undercut areas 52 preferably extend beyond a diameter line of the sleeves 40 and 50. That is, the undercut areas 52 occupy more than half of the perimeter of a cross-section of the sleeves 40 and 50. When the flexural pivot is fully assembled, the centerline of area 54 of sleeve 50 is located at 180 degrees from the centerline of area 54 of sleeve 40. This positioning will be discussed further with respect to the manufacturing method.

Figure 9:
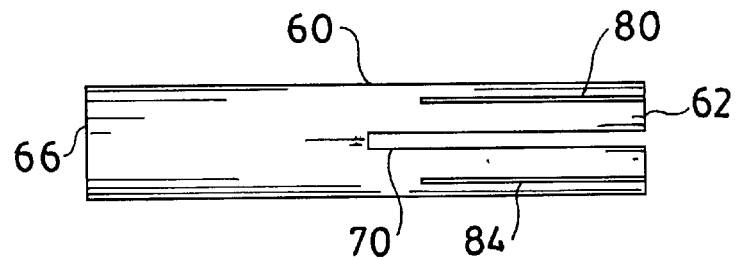
FIG. 9 shows a left side plan view of a core for use in the flexural pivot of the present invention.
Figure 10:
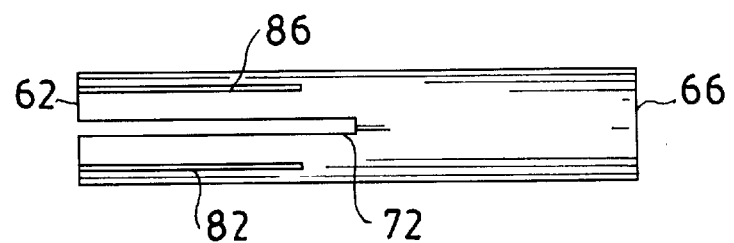
FIG. 10 shows a right side plan view of a core for use in the flexural pivot of the present invention.
Figure 11:
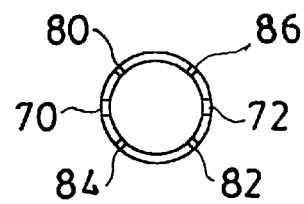
FIG. 11 shows a front cross-sectional view of a slotted section of the core for use in the flexural pivot of the present invention.
Figure 12:
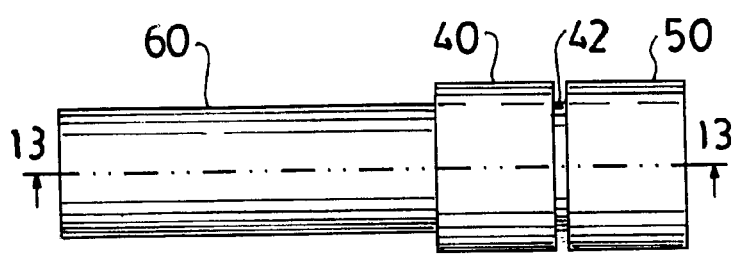
FIG. 12 shows a side plan view of a flexural pivot during one stage of assembly according to the present invention.

Core 60 may be manufactured with two travel slots 70, 72 and four flexure slots 80, 82, 84, and 86 shown in FIGS. 9, 10, and 11. All of the slots preferably extend through one end 62 of the core 60 designated as the slotted end 62. The section of the core 60 through which the slots extends is designated as the slotted section 64, shown in FIG. 1. Likewise, the core 60 further comprises an unslotted end 66 and an unslotted section 68. As shown in FIG. 11, the core 60 is shown to have two pairs of diametrically opposed flexure slots, first pair 80 and 82, and second pair 84 and 86. For the illustrated embodiment, each flexure slot is shown as being approximately 90 degrees from an adjacent flexure slot, whereby such positioning of the flexure slots corresponds to perpendicularly arranged flexures 21 and 22. Of course, depending on the specific application, it may be desirable for flexures 21 and 22 to have an angular orientation with respect to one another other than perpendicular. The location of the flexure slots should therefore correspond to the desired location of the flexures 21 and 22 with respect to one another and the resultant load capability of the pivot. The travel slots 70 and 72 are also diametrically opposed and each travel slot is located between two flexure slots, and, as shown for the illustrated embodiment, may be approximately 45 degrees from adjacent flexure slots. The travel slots 70 and 72 may extend further into the slotted section 64 than the flexure slots. The width of the travel slots 70 and 72 will determine the allowable rotation of one side of the pivot with respect to the other side once fully assembled. Core 60 may be coated with a suitable bonding material, not shown, prior to assembly.

During one preferred method of assembly, flexures 21 and 22 shown in FIGS. 2 and 3 (or FIGS. 4 and 5) may be interlocked together and inserted in the flexure slots 80, 82, 84, and 86 of the core 60 flush with the slotted end 62. Accordingly, the flexures 21 and 22 are arranged at an angular orientation with respect to one another corresponding to the angular orientation of flexure slots 80 and 82 to flexure slots 84 and 86. To assist in ensuring that the flexures 21 and 22 are flush with the slotted end 62, the length of the flexure slots 80, 82, 84, and 86 may be substantially equal to the length of the flexures 21 and 22 so that abutment of one edge of the flexures 21 and 22 with an end of the flexure slots results in a flush location of the opposed edge of the flexures with respect to the slotted end 62.

Then, sleeve 50 may be placed on slotted section 64 of core 60 such that one end of the sleeve is flush with slotted end 62 of core 60, and the undercut area 52 of sleeve 50 will be orientated 90 degrees from the travel slots 70 and 72 in the core 60. Sleeve 40 may be placed on the core 60 from the end 66 opposite the slotted end 62 such that undercut area 52 of sleeve 40 is orientated 180 degrees from the undercut area 52 of sleeve 50. Ultimately, the inner surface of area 54 of sleeve 50 will be bonded to the outer surface of core 60 between travel slots 70, 72, and the inner surface of area 54 of sleeve 40 will be bonded to the outer surface of core 60 between travel slots 72, 70, such that area 54 of each sleeve is orientated 180 degrees with respect to one another. Sleeve 40 is preferably positioned at a predetermined distance from sleeve 50 to form a slot or space 42 between the two sleeves 40, 50. Alternatively, both sleeves 40 and 50 may be slid onto the core 60 from the slotted end 62 so long as the sleeve 50 is flush with the slotted end 62, the space 42 is maintained between the sleeves 40 and 50, and rotational orientation of the sleeves with respect to one another is maintained.

The entire assembly may take place on a fixture that will hold the parts together in a desired position until they are tack welded to hold the parts in place. The assembly is then preferably heated in a suitable furnace such that the bonding material will flow and bond the flexures 21, 22, core 60, and sleeves 40, 50 together. A suitable bonding material for this method is brazing metals, such as silver, copper or a combination thereof. For example, a Ag—Cu metal may be plated on the core prior to assembly, followed by heating the assembly to braze the joints of the parts.

Figure 13:
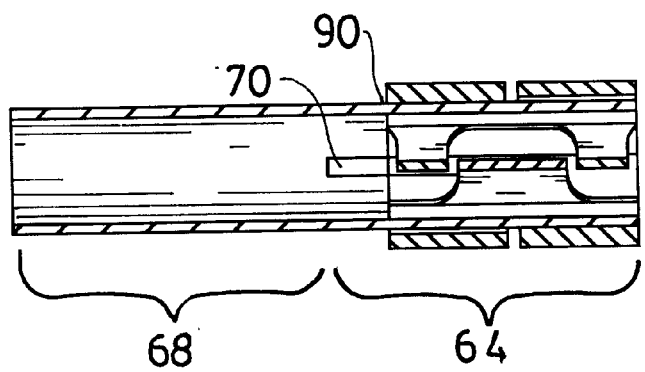
FIG. 13 shows a side cross-sectional view taken along line 13—13 of FIG. 12.
Figure 14:
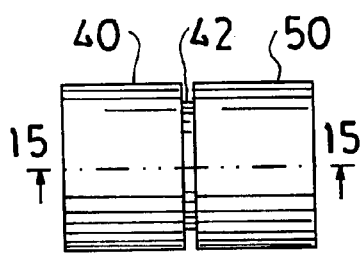
FIG. 14 shows a side plan view of a completed flexural pivot according to the present invention.
Figure 15:
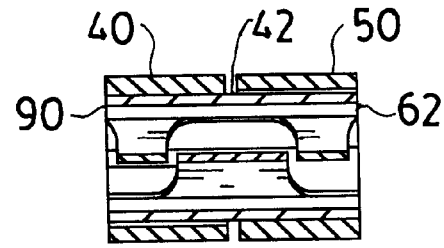
FIG. 15 shows a side cross-sectional view taken along line 15—15 of FIG. 14.

Following the assembly and bonding of the parts, the unslotted section 68 of the core 60 will then be cut off along line 90 shown in FIG. 13. Line 90 also cuts off part of the travel slots 70 and 72 such that the core 60 of the resultant flexural pivot is subdivided into one section bonded to sleeve 40 and one section bonded to sleeve 50, whereby the two ends of the pivot are allowed to rotate relative to one another, the amount of allowable rotation being defined by the width of the travel slots. The resultant flexural pivot is shown in FIGS. 14 and 15.

An alternate construction of the flexural pivot which utilizes welding, instead of the bonding material, is also possible. First, the flexures 21 and 22 may be welded to the core 60 before positioning the sleeves 40 and 50. After the sleeves 40 and 50 are in position, they may be welded to the core 60 on sides opposite the undercut areas 52. Once the parts are securely welded together, the unslotted section 68 may be cut off along line 90 to form the resultant flexural pivot. Various welding methods are known in the art, for example, electron beam welding.

Some of the advantages over the prior art include:

1. The pivot will be heat treated only once, thereby reducing chance of bridging, embrittlement, and flexure warping.
2. Fewer assembly operations will be required.
3. Reduction in cost and manufacturing lead time.
4. A one-piece core replaces the use of four quadrants as in the prior art.
5. Uniform thickness of the inner wall of the core 60 eliminates the thin quadrants in the prior art.

Thus, component parts for a flexural pivot and a method for assembling and manufacturing a flexural pivot are disclosed which meets the objects and advantages of the present invention. It is to be understood, however, that changes can be made in the disclosed embodiments and methods by persons skilled in the art without departing from the invention as set forth in the appended claims.

What is claimed:

1. An assembly for forming a multipiece flexural pivot comprising:
   a) a tubular core having
      i) first and second ends,
      ii) a slotted section having first and second pairs of diametrically opposed unconnected and spaced apart flexure slots extending into said tubular core from said first end and ending at a point prior to reaching said second end and
      iii) an unslotted section extending from said point to said second end;
   b) first and second interlocking flexures positioned within said tubular core and associated respectively with said first and second pairs of flexure slots, said first flexure having opposite sides each received within one of said first pair of flexure slots and said second flexure having opposite sides each received within one of said second pair of flexure slots;
   c) spaced apart first and second sleeves on said tubular core slotted section, each sleeve having an inner surface portion fixed to said tubular core and an undercut inner surface portion spaced from said tubular core, said undercut portion occupying at least one half of the perimeter of a cross section of each sleeve, said first sleeve being positioned at said tubular core first end and said second sleeve being positioned adjacent said point; and
   d) said tubular core unslotted section being removable to form said multipiece flexural pivot.

2. An assembly as in claim 1 wherein each of said flexure slots extend axially inward into said tubular core a substantially equal distance from said first end.

3. An assembly as in claim 1 wherein each flexure slot is positioned approximately 90 degrees from an adjacent slot.

4. An assembly as in claim 1 further comprising a pair of diametrically opposed travel slots extending axially inward into said tubular core from said first end and terminating short of said unslotted end.

5. An assembly as in claim 4 wherein each flexure slot is positioned approximately 90 degrees form an adjacent flexure slot and each travel slot is positioned approximately 45 degrees from an adjacent flexure slot.

6. An assembly as in claim 4 wherein each travel slot extends farther into said tubular core than said flexure slots.

7. An assembly as in claim 4 wherein said travel slots are substantially equal in length.

8. An assembly as in claim 4 wherein said first interlocking flexure comprises a flat inner spring and said second interlocking flexure comprises a flat outer spring, said inner spring fitted within said outer spring and the opposite sides of said interlocking flexures being substantially straight and equal in length to the length of said flexure slots.

9. An assembly as in claim 1 wherein the combined length of said first and second sleeves is slightly less than the length of a flexure slot.

10. An assembly for use in the manufacture of a flexural pivot comprising:
    a) a tubular core having a slotted end, an opposite unslotted end and first and second pairs of diametrically opposed unconnected and spaced apart flexure slots extending inward from said slotted end and ending at a point prior to reaching said unslotted end such that each flexure slot has a given length;
    b) said tubular core further having a pair of diametrically opposed travel slots extending axially inward from said slotted end and ending at a point prior to reaching said unslotted end, each travel slot having a length greater than the length of said flexure slots;

c) a flexure associated with each of said pairs of flexure slots, each flexure having opposite sides with each side being positioned in one of the flexure slots of an associated pair;

d) spaced apart first and second sleeves positioned on said tubular core each sleeve having an iuner surface portion fixed to said tubular core and an undercut inner surface portion spaced from said tubular core wherein said undercut portion occupies at least one half of the perimeter of a cross section of each sleeve, said first sleeve being positioned at said tubular core slotted end and said second sleeve positioned adjacent said point; and e) a portion of said tubular core extending from said point to said unslotted end being removable to provide said flexural pivot.

11. An assembly as in claim 10 wherein each flexure slot extends axially inward from said slotted end a substantially equal distance.

12. An assembly as in claim 10 wherein each flexure slot is positioned approximately 90 degrees from an adjacent flexure slot.

13. An assembly as in claim 12 wherein each travel slot is positioned approximately 45 degrees from an adjacent flexure slot.

14. An assembly as in claim 13 wherein said travel slots are equal in length to each other.

15. A method for fabricating a multi-piece flexural pivot comprising:

forming a slotted tubular core with a slotted end and an unslotted end;

sliding at least two flexures within slots of a slotted section of the slotted tubular core so as to be flush with the slotted end;

placing first and second sleeves over the core so that the first and second sleeves do not touch each other; and, cutting off an unslotted section of the core including the unslotted end.

16. The method of claim 15 wherein the step of forming a slotted tubular core comprises cutting two pairs of diametrically opposed flexure slots for receiving the at least two flexures and for dividing the slotted end into quadrants.

17. The method of claim 16 wherein the step of sliding at least two flexures within slots comprises inserting the flexures within the flexure slots until they abut an end of the slots.

18. The method of claim 17 further comprising the steps, prior to the step of sliding the two flexures within the flexure slots, of interlocking an inner flexure in an outer flexure and forming a pair of interlocking flexures having sides substantially equal in length to the flexure slots.

19. The method of claim 16 further comprising cutting a pair of diametrically opposed travel slots into the slotted end of the tubular core.

20. The method of claim 15 further comprising the step, prior to sliding the two flexures within slots, of applying a bonding material to the core.

21. The method of claim 20 further comprising the step of holding the tubular core at its unslotted end for assembly.

22. The method of claim 20 further comprising the step, between the step of placing the first and second sleeves on the core and the step of cutting the unslotted section off, of placing the tubular core, flexures, and sleeves within a furnace and heating until the bonding material flows and bonds the flexures, core, and sleeves together.

23. The method of claim 15 further comprising the step of welding together the flexures to the core prior to placing the first and second sleeves on the core.

24. The method of claim 23 further comprising the step of welding the sleeves in position on the core after the step of placing the first and second sleeves on the core and prior to the step of cutting off the unslotted section.

25. The method of claim 15 wherein the second sleeve is placed over the core so that an end of the second sleeve is flush with the slotted end of the tubular core, and the unslotted section of the tubular core is cut off flush with an end of the first sleeve.

* * * * *